CIRCUIT ARRANGEMENT FOR PRODUCING A SAWTOOTH CURRENT IN THE VERTICAL DEFLECTOR OF A TELEVISION APPARATUS

Filed Oct. 27, 1955

INVENTORS
PETER JOHANNES HUBERTUS JANSSEN
WOUTER SMEULERS
BY Fred M. Vogel
AGENT United States Patent Office 2,874,329

Patented Feb. 17, 1959

2,874,329

CIRCUIT ARRANGEMENT FOR PRODUCING A SAWTOOTH CURRENT IN THE VERTICAL DEFLECTOR OF A TELEVISION APPARATUS

Peter Johannes Hubertus Janssen and Wouter Smeulers, Eindhoven, Netherlands, assignors, by mesne assignments, to North American Philips Company, Inc., New York, N. Y., a corporation of Delaware Application October 27, 1955, Serial No. 543,198

Claims priority, application Netherlands November 10, 1954

2 Claims. (Cl. 315—27)

The invention relates to a circuit arrangement for producing a sawtooth current in the vertical deflector of a television apparatus, the coil being coupled via a transformer with the anode circuit of a tube, to the control-grid of which are supplied a sawtooth voltage and a parabola-shaped voltage.

In such an arrangement the anode current of the tube, must, as is known, contain a sawtooth component and a parabola-shaped component. If the anode-current-grid-voltage characteristic curve of the tube is straight, a sawtooth voltage and a parabola-shaped voltage must be fed to the control-grid thereof, the amplitude ratio of these voltages depending upon the transformer and the deflector coil included in the anode circuit. If the characteristic curve of the tube is slightly quadratic the amplitude of the parabola-shaped voltage supplied can be reduced, even to zero. If the characteristic curve is strongly curved, it may even be desirable to supply a parabola-shaped voltage of opposite polarity to the control-grid.

An object of the invention is to provide a simple circuit arrangement for controlling the wave-shape of the input signal to a vertical deflection amplifier tube, thereby achieving the advantage of improved control over the linearity of the sawtooth current in the vertical deflector coil. Other objects will be apparent.

As will be described more fully hereinafter, the use of the conventional arrangements gives rise to difficulties with respect to the control of the aforesaid amplitude ratios of the signals applied to the control grid of the vertical deflection amplifier tube.

The circuit arrangement according to the invention mitigates this disadvantage and has the feature that a first sawtooth voltage is fed to the grid leak resistor of the tube, this leak resistor being constituted by the series combination of a resistor and an adjustable part of a potentiometer, to which a second sawtooth voltage is supplied, the leak resistor forming part of an integrating network for integrating the second sawtooth voltage.

Figure 1:
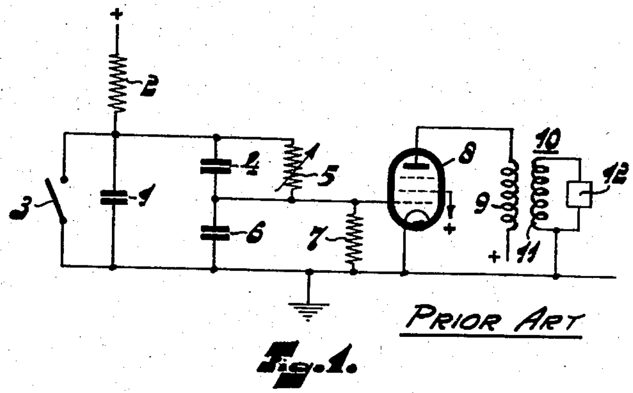
Figure 2:
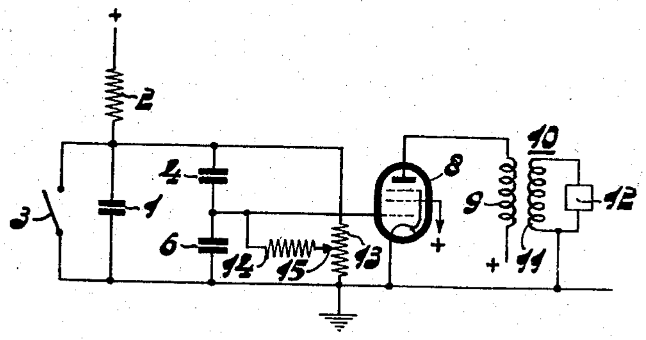
Figure 3:
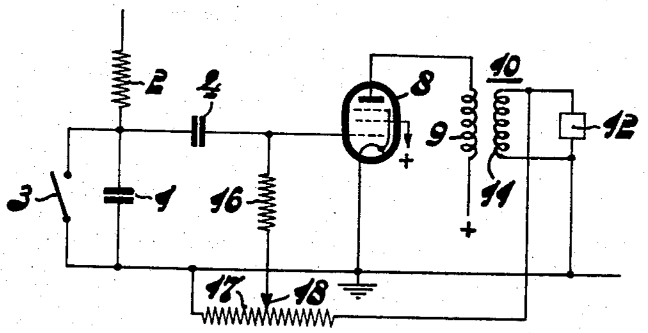

The circuit arrangement according to the invention will be described more fully with reference to the drawing, in which Fig. 1 shows a known arrangement, Fig. 2 one embodiment of the arrangement according to the invention, and Fig. 3 shows a second embodiment of the arrangement according to the invention.

In the known circuit arrangement shown in Fig. 1 a capacitor 1 is charged via a leak resistor 2 and periodically discharged via the switch 3, which may be constructed in various known ways. Across the capacitor 1 a sawtooth voltage is produced. This voltage is fed to a network consisting of a parallel circuit of a capacitor 4 and a variable resistor 5 and of the capacitor 6, connected in series with this parallel circuit. The voltage across the capacitor 6 is fed to the grid leak resistor 7, included in the control-grid circuit of the tube 8. The anode circuit of the tube 8 includes the primary winding 9 of a transformer 10. To the secondary winding 11 of this transformer 10 is connected the vertical deflector coil 12, of which one end is connected to earth.

Across the capacitor 6 of the dual network 4, 5, 6, there is produced in the first place a sawtooth voltage owing to the capacitative voltage division of the sawtooth voltage across the capacitor 1 brought about by the capacitors 4 and 6. Moreover, the series combination of the resistor 5 and the capacitor 6 is traversed by a sawtooth current, so that across the capacitor 6 there is produced a parabola-shaped voltage. By varying the value of the resistor 5 the amplitude of the parabola-shaped voltage component may be varied.

However, if it is desired to render the parabola-shaped voltage very small or to suppress it completely, the resistor 5 has to have a very high or substantially infinite value. Moreover, it is not possible to reverse the polarity of the parabola-shaped voltage.

This is, however, the case with the embodiments of the arrangement according to the invention shown in Figs. 2 and 3. Parts of this arrangement corresponding to those of the arrangement shown in Fig. 1 are designated by the same reference numerals.

In the arrangement shown in Fig. 2 a potentiometer 13 is connected in parallel with the series combination of the capacitors 4 and 6. The junction of the capacitors 4 and 6 is connected via a resistor 14 to the adjustable tapping 15 of the potentiometer 13. The grid leak resistor of the tube 8 is constituted by the series combination of the constant resistor 14 and the variable part of the resistor 13, located between the tapping 15 and earth. To this leak resistor is supplied a first sawtooth voltage, i. e. the voltage produced by the capacitative voltage division produced across the capacitor 6 by means of the capacitors 4 and 6. To the potentiometer 13 is supplied a second sawtooth voltage, i. e. the voltage which is produced across the capacitor 1. If the tapping is adjusted in a manner such that the upper part of the potentiometer 13 and the lower part thereof are inversely proportional as the capacities of the capacitors 4 and 6, the same sawtooth voltage will be produced across the lower part of the potentiometer 13 as that across the capacitor 6, so that the resistor 14 is not traversed by current and hence only a sawtooth voltage is fed to the control-grid of the tube 8.

If the tapping 15 occupies a higher position, the amplitude of the sawtooth voltage across the lower part of the potentiometer 13 is higher than that of the sawtooth voltage across the capacitor 6, so that the capacitor 6 is charged via the resistor 14 and a parabola-shaped voltage is produced at the same time across the capacitor 6. However, if the tapping occupies a lower position, than in the first-mentioned case, the capacitor 6 is discharged via the resistor 14, so that across the capacitor 6 is also produced a parabola-shaped voltage of opposite polarity.

In the arrangement shown in Fig. 3 a series combination of the capacitor 4, a resistor 16 and a variable part of a potentiometer 17 is connected in parallel with the capacitor 1. This potentiometer 17 is connected in parallel with the vertical deflector coil 12, so that across the potentiometer there is produced a sawtooth voltage. The leak resistor of the control-grid circuit of the tube 8 is constituted by the series combination of the resistor 16 and the adjustable part of the potentiometer 17 located between the tapping 18 and earth. The first sawtooth voltage is produced across the capacitor 1 and is fed via the capacitor 4 to the leak resistor. The second sawtooth voltage is produced across the potentiometer 17 and part thereof furnishes, via the integrating network of the resistor 16 and the series combination of the capacitors 4 and 1, a parabola-shaped voltage across this series combination. As in the arrangement shown in Fig. 2, a positive or a negative amplitude or a zero amplitude may, in this case also, be obtained in a simple manner by displacing the tapping 18.

What is claimed is:

1. A circuit for producing a sawtooth current in a deflector coil of a television apparatus, comprising an electron discharge tube having a cathode, a control grid and an anode, signal-conducting means coupling said deflector coil to said anode, a sawtooth voltage source, a first capacitor connected between said sawtooth voltage source and said control grid, a second capacitor connected between said control grid and said cathode, a potentiometer connected across said first and second capacitors and having a tap thereon, and a resistor connected between said tap and said control grid thereby forming an integrating network in conjunction with said second capacitor, whereby said second capacitor alternately charges and discharges in accordance with said sawtooth voltage and whereby an integrated sawtooth voltage is applied to said second capacitor which is capable of affecting the sawtooth voltage charge on said second capacitor.

2. A circuit for producing a sawtooth current in a deflection coil of a television apparatus, comprising an electron discharge tube having a cathode, a control grid and an anode, signal-conducting means coupling said deflector coil to said anode, a sawtooth voltage source having a first capacitor connected across output terminals thereof, a second capacitor connected between one of said output terminals and said control grid, means connecting the other of said output terminals to said cathode, a potentiometer having a tap thereon, means coupling said potentiometer between said anode and said cathode, and a resistor connected between said tap and said control grid thereby forming an integrating network in conjunction with said first and second capacitors, whereby said capacitors alternately charge and discharge in accordance with said sawtooth voltage and whereby an integrated sawtooth voltage is applied to said capacitors which is capable of affecting the sawtooth voltage charges on said capacitors.

References Cited in the file of this patent

UNITED STATES PATENTS

| | | |
|---|---|---|
| 2,480,511 | Schade | Aug. 30, 1949 |
| 2,510,027 | Torsch | May 30, 1950 |
| 2,621,292 | White | Dec. 9, 1952 |
| 2,621,307 | Bull | Dec. 9, 1952 |
| 2,633,555 | Tourshou | Mar. 31, 1953 |